(12) United States Patent
Grant et al.

(10) Patent No.: US 11,530,558 B2
(45) Date of Patent: Dec. 20, 2022

(54) SECURITY BARRIER FOR OUTWARD-SWING DOORS OF VEHICLES AND METHOD THEREOF

(71) Applicant: 1435894 ALBERTA CORP., Calgary (CA)

(72) Inventors: Christopher Nelson Grant, Calgary (CA); Laura Jane Grant, Calgary (CA)

(*) Notice: Subject to any disclaimer, the term of this patent is extended or adjusted under 35 U.S.C. 154(b) by 427 days.

(21) Appl. No.: 16/450,549

(22) Filed: Jun. 24, 2019

(65) Prior Publication Data

US 2020/0399941 A1 Dec. 24, 2020

(51) Int. Cl.
| | |
|---|---|
| *E05C 19/00* | (2006.01) |
| *E05B 67/38* | (2006.01) |
| *E05B 83/44* | (2014.01) |
| *E05C 19/18* | (2006.01) |
| *B60J 5/04* | (2006.01) |

(52) U.S. Cl.
CPC .......... *E05C 19/003* (2013.01); *E05B 67/383* (2013.01); *E05B 83/44* (2013.01); *B60J 5/049* (2013.01); *E05Y 2900/512* (2013.01); *E05Y 2900/531* (2013.01)

(58) Field of Classification Search
CPC ...... E05C 19/003; E05C 19/184; E05C 19/18; E05B 67/383; E05B 83/44; B60J 5/049; E05Y 2900/512; Y10T 16/61; Y10T 70/5168; Y10T 70/5199; Y10T 292/23; Y10T 292/65; Y10T 292/67; Y10T 292/34; Y10T 292/37; Y10T 292/373; Y10T 292/376; Y10T 292/379; Y10T 292/382; Y10T 292/385; Y10T 292/388; Y10T 292/391; Y10T 292/394; Y10T 292/397; Y10S 292/15
USPC ........... 70/94, 101; 49/124, 394, 449; 16/82; 292/DIG. 15, 259 R, 338, 339, 288–298
See application file for complete search history.

(56) References Cited

U.S. PATENT DOCUMENTS

| | | | | |
|---|---|---|---|---|
| 1,622,999 A | * | 3/1927 | Frith ...................... | E05B 67/24 70/38 A |
| 1,902,665 A | * | 3/1933 | Reinhold ................ | E05B 67/26 70/39 |
| 4,074,788 A | * | 2/1978 | Joubert .................. | B60J 5/0487 16/85 |
| 4,078,836 A | * | 3/1978 | Wilson .................. | E05C 19/003 292/259 R |
| 4,747,181 A | * | 5/1988 | Davis .................... | E05C 19/003 16/82 |

(Continued)

*Primary Examiner* — Lloyd A Gall
(74) *Attorney, Agent, or Firm* — FILFIL IP Inc.

(57) ABSTRACT

An apparatus for providing improved security to an outward-swing door of a vehicle. The outward-swing door is on a sidewall of a main housing of the vehicle and has a pivotal end and a distal end opposite to the pivotal end. The outward-swing door is outwardly pivotable about the pivotal end thereof. The apparatus comprises a connecting structure for coupling to a bottom wall of the main housing, a base structure for coupling to the connecting structure so as to locate adjacent the outward-swing door and outside a swing path of the outward-swing door, and a blocking structure demountably coupled to the base structure, at least a portion thereof extendable into the swing path of the outward-swing door for restricting the outward-swing door to open to a predefined maximum extent.

19 Claims, 12 Drawing Sheets

(56) References Cited

U.S. PATENT DOCUMENTS

| | | | | |
|---|---|---|---|---|
| 4,822,206 A | * | 4/1989 | Roussel | E01F 13/085 |
| | | | | 404/10 |
| 5,340,172 A | * | 8/1994 | Sweet | E05C 19/003 |
| | | | | 292/259 R |
| 5,383,254 A | * | 1/1995 | Wigley, Sr. | E05B 65/0894 |
| | | | | 16/82 |
| 5,490,304 A | * | 2/1996 | Winner, Jr. | E05F 5/06 |
| | | | | 16/82 |
| 5,590,918 A | * | 1/1997 | Kambalov | E05C 17/00 |
| | | | | 16/82 |
| 5,711,555 A | * | 1/1998 | Leedy | E05C 19/184 |
| | | | | 292/202 |
| 5,727,822 A | * | 3/1998 | Truong | E05C 17/46 |
| | | | | 16/82 |
| 5,873,273 A | * | 2/1999 | Vick | E05C 19/003 |
| | | | | 70/101 |
| 6,308,996 B1 | * | 10/2001 | Ganimian | E05C 19/003 |
| | | | | 16/82 |
| 6,349,573 B1 | * | 2/2002 | Johnson | B60R 25/00 |
| | | | | 292/289 |
| 8,601,841 B1 | * | 12/2013 | Jacobs | B60R 25/09 |
| | | | | 70/237 |
| 8,794,866 B2 | * | 8/2014 | Petryshyn | E01F 13/085 |
| | | | | 404/6 |
| 2012/0247159 A1 | * | 10/2012 | Shelton | B60P 1/6409 |
| | | | | 70/58 |

* cited by examiner

SECURITY BARRIER FOR OUTWARD-SWING DOORS OF VEHICLES AND METHOD THEREOF

FIELD OF THE DISCLOSURE

The present disclosure relates generally to a security barrier for vehicles, and in particular to a security barrier in the form of a stake-pocket barrier for securely preventing the opening of outward-swing doors of vehicles and a method thereof.

BACKGROUND

Recreational Vehicles (RVs) have been widely used. For example, according to Kampgrounds of America, Inc., there are about 5.8 million RVs in Canada with 68% in Western Canada and 60% in Eastern Canada, and there has been an increase in sales of 22$ to 28% annually since 2016.

A RV generally comprises a main housing on a chassis and comprises wheels for moving. Some RVs may be vehicles without an engine and may need to be towed for moving (similar to a trailer). Some RVs may be self-propelled vehicles with engines. Some self-propelled RVs may have separate cabs for drivers to sit therein. In some other self-propelled RVs, the cab may be accessible from the main housing or may be an integrated part thereof.

Typically, RVs may be categorized into different types such as Class A motorhomes (including bus conversions), Class B motorhomes (e.g., camper vans), Class C motorhomes, truck campers, popup campers (e.g., tent trailers), toy haulers (which may have an opening door or lift door), travel trailers (towed behind a vehicle), teardrop trailers, caravan, hybrid trailers (a mix of travel and tent trailer), fifth wheel trailers, parked trailers (used as a vacation or resort cottage), and the like.

RVs may be used for travel or for permanent or temporary living quarters. Usually, RVs experience extended storage time stored in various places such as storage lots, campgrounds, households, driveways or lots, and/or the like with minimal or even without attendance, and consequently face increased risks of thefts such as stealing, break-in, battery theft, and other content theft.

Efforts have been made in prior art for preventing RVs being stolen. For example, various types of locks with improved security features such as trailer coupler locks, coupler latch pin locks, universal receiver locks, cable locks, and the like, may be used for connecting and locking the RV to the vehicle or locking the RV hitch while it is parked.

Another issue leading to the increased risks of thefts is that RV doors and locks are usually less secure compared to other door/lock systems. RVs and in particular the housing thereof are usually made of aluminum or fiberglass over a wood frame. RV doors typically comprise a screen door that hooks to a full door by a hook-and-keeper or a full door with a screen, with a door lock installed on the screen door or full door. Most RV locks are coded- or keyed-entry locks having flimsy single bolts that only shallowly extend into the receiving recess on the aluminum or fiberglass door-frame (less than 2.5 cm or 1 inch). Such a lock may be easily broken by an intruder and may not provide sufficient protection against content theft breaking through the door.

In prior art, safety chains, cables, cable locks, and the like have been used for improving the security of RV doors and locks. However, the security improvement of these devices is limited.

Retro-fitted door-locks and hasps have also been used for improving the security of RV doors and locks. However, retro-fitted door-locks and hasps require holes to be drilled into the RV frame for installation. As RVs and in particular the housing thereof are usually made of aluminum or fiberglass over a wood frame, drilling holes on the housing may cause risks of water ingress therethrough to the wood frame behind the aluminum or fiberglass lamination and cause the wood frame to rot.

Other types of vehicles such as some trailers for goods storage and transportation may also have issues similar to those described above (e.g., long-term storage without sufficient attendance, doors easy to break-in, and the like).

Therefore, there is a desire for an apparatus and method for improving the security of vehicle doors.

SUMMARY

According to one aspect of this disclosure, there is provided an apparatus for providing improved security to an outward-swing door of a vehicle, said outward-swing door on a sidewall of a main housing of the vehicle and having a pivotal end and a distal end opposite to the pivotal end, said outward-swing door outwardly pivotable about the pivotal end thereof. The apparatus comprises: a connecting structure for coupling to a bottom wall of the main housing; a base structure for coupling to the connecting structure so as to locate adjacent the outward-swing door and outside a swing path of the outward-swing door; and a blocking structure demountably coupled to the base structure, at least a portion thereof extendable into the swing path of the outward-swing door for restricting the outward-swing door to open to a predefined maximum extent.

In some embodiments, the connecting structure is directly coupled to the bottom wall of the main housing.

In some embodiments, the vehicle comprises a stair structure extending from the bottom wall of the main housing; and the connecting structure is coupled to the stair structure thereby coupling to the bottom wall of the main housing.

In some embodiments, the base structure is located adjacent the distal end of the outward-swing door at a distance to the pivotal end thereof greater than a width of the outward-swing door.

In some embodiments, the base structure is located adjacent the pivotal end of the outward-swing door with an angle $\alpha$ to the distal end thereof with respect to the pivotal end thereof, and $90° \leq \alpha \leq 180°$.

In some embodiments, the base structure is located adjacent the pivotal end of the outward-swing door and below a bottom thereof.

In some embodiments, the base structure comprises at least one elongated hollow body having a top opening for demountably receiving the blocking structure.

In some embodiments, the at least one of the at least one elongated hollow body comprises a bottom wall.

In some embodiments, the blocking structure comprises at least one coupling structure for demountably coupling to the base structure.

In some embodiments, each of the at least one coupling structure is a post receivable in a corresponding one of the at least one elongated hollow body; and said post comprises a locking structure for locking the post to the elongated hollow body.

In some embodiments, said post comprises a stopper for delimiting a position of the post with respect to the elongated hollow body.

In some embodiments, said stopper is a protrusion extending from the post or a downwardly facing stop shoulder on the post.

In some embodiments, the blocking structure further comprises a crossbar extending from the at least one coupling structure.

In some embodiments, the crossbar is a curved bar.

In some embodiments, the blocking structure comprise only one coupling structure; and the crossbar extends from the top of the coupling structure along opposite directions thereby forming a T-shape blocking structure.

In some embodiments, the blocking structure comprise only one coupling structure; and the crossbar extends from the top of the coupling structure thereby forming an L-shape blocking structure.

In some embodiments, the blocking structure comprise two coupling structures; and the crossbar extends between the top ends of the two coupling structures thereby forming a blocking structure with a "[" shape.

In some embodiments, the blocking structure comprise two coupling structures; and the crossbar extends between the two coupling structures thereby forming an H-shape blocking structure.

In some embodiments, the blocking structure comprise two coupling structures; and the crossbar extends between the two coupling structures with an adjustable length.

In some embodiments, the crossbar comprises a sleeve extending from one of the two coupling structures movably receiving there a bar extending from a second one of the other of the two coupling structures.

DETAILED DESCRIPTION

Figure 1A:
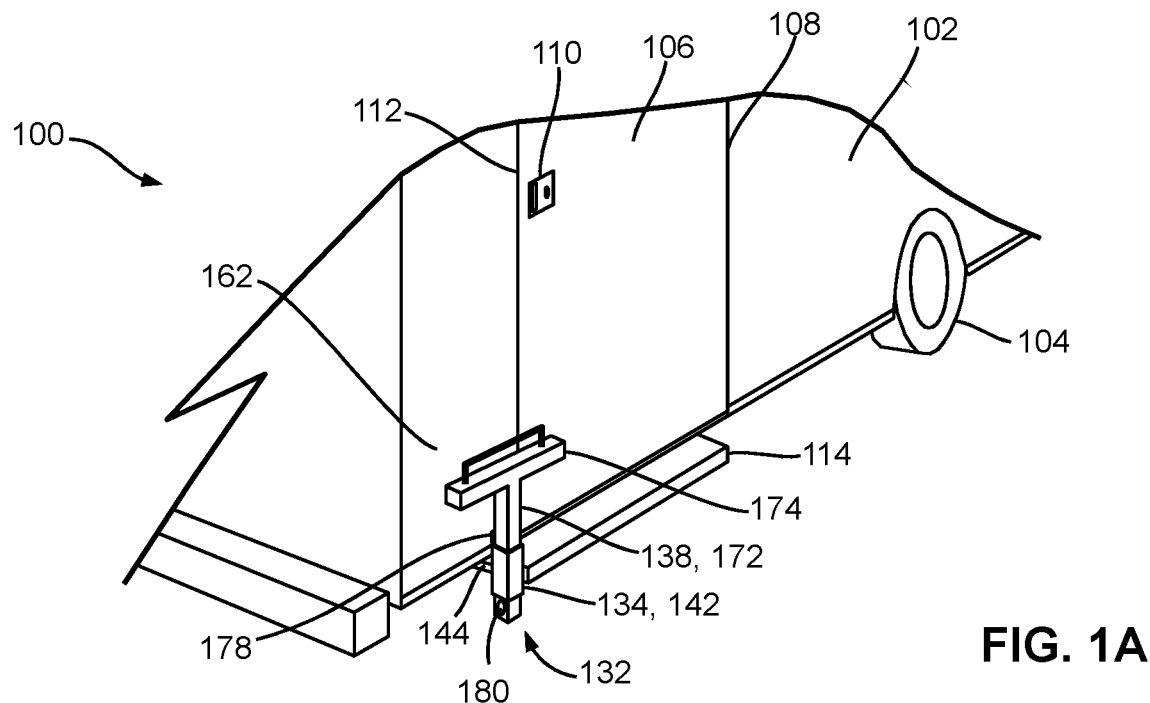
FIG. 1A is a perspective view of a portion of a recreation vehicle (RV) having an outward-swing door on a main housing thereof and a security barrier thereabout, according to some embodiments of this disclosure, the security barrier comprising a base structure and a blocking structure for preventing the outward-swing door from opening.
Figure 1B:
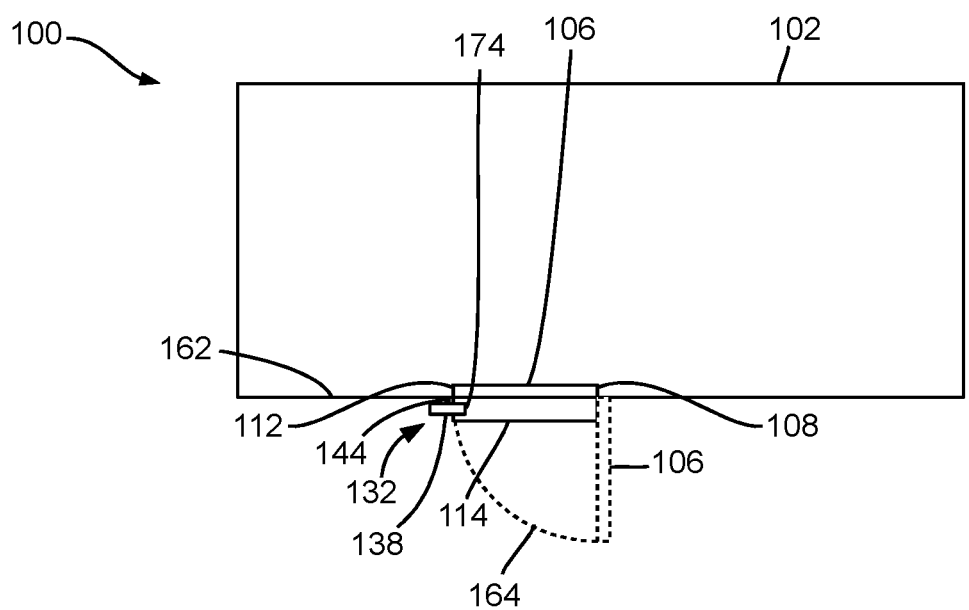
FIG. 1B is a plan view of the RV shown in FIG. 1A, illustrating the swing path of the outward-swing door and the position of the security barrier, at least a portion of the blocking structure of the security barrier extending into the swing path.

Embodiments disclosed herein relate to a security barrier for vehicles such as recreational vehicles (RVs), trailers, and the like, having one or more outward-swing doors. Various embodiments of the security barrier may be used depending on the characteristics of the doors such as the types and dimensions thereof, the characteristics of the stairs such as the dimensions thereof and their alignment to the doors.

In various embodiments, the security barrier comprises a base structure mountable to the bottom of the main housing of a vehicle outside the main housing and the swing path of a respective outward-swing door. The base structure comprises one or more metal, elongated hollow bodies each having an elongated bore for demountably receiving a blocking structure such that at least a portion of the blocking structure extends into the swing path of a closed outward-swing door and in proximity therewith thereby preventing the outward-swing door from opening and deterring unauthorized access to the interior of the vehicle.

In various embodiments, the cross-section of the elongated hollow body may be in any suitable shape such as circle, ellipse, rectangle, triangle, polygon, and/or the like. The elongated hollow body generally has a top opening accessible to the elongated bore thereof. In some embodiments, the elongated hollow body may also have a bottom opening thereby forming a metal stake sleeve. In some other embodiments, the elongated hollow body may have a bottom wall thereby forming a metal stake pocket.

Each elongated hollow body may be coupled to a metal connector or connecting structure which may be coupled to a stair structure under the main housing via bolting, screwing, welding, clamping, and/or other suitable means. Alternatively, the metal connector may be directly coupled to the bottom of the main housing by suitable means. In some embodiments, the metal connector may comprise a notch about a front end thereof for adapting to the siding of the main housing.

In some embodiments, one or more elongated hollow bodies may be coupled to a step (such as the topmost step) of the stair structure preferably with the top of the elongated hollow body flush with that of the step.

The blocking structure may comprise one or more coupling structures for received into respective elongated hollow bodies. Each coupling structure may comprise a stopper or a stop shoulder for vertically delimiting the blocking structure in the elongated hollow body. At least one of the one or more coupling structures may comprise a locking hole for locking the blocking structure to the base structure (and thus the RV) using a lock. In some embodiments wherein the base structure comprises one or more metal stake pockets, the coupling structure may not comprise any stopper or stop shoulder.

In some embodiments, the blocking structure may comprise one coupling structure in the form of a post (also denoted a stake hereinafter) and a crossbar substantively perpendicularly extending from the top of the post along opposite directions thereby forming a T-shape blocking structure. The crossbar acts as a blocking structure with at least a portion thereof extending into the swing path of an outward-swing door adjacent thereto for preventing the outward-swing door from opening. In some embodiments, the blocking structure may comprise a handle coupled to the crossbar. Such a T-shape blocking structure may be used in the RV wherein the steps of the stair structure and the outward-swing door are not aligned or the steps of the stair structure are wider than the outward-swing door. One lock may be used to lock the blocking structure to the base structure.

In some embodiments, the blocking structure may comprise one coupling structure with a crossbar extending from a top end thereof thereby forming an L-shape blocking structure. The crossbar acts as a blocking structure with at least a portion thereof extending into the swing path of an outward-swing door adjacent thereto for preventing the outward-swing door from opening. Such an L-shape blocking structure may be used in the RV wherein the steps of the stair structure and the outward-swing door are not aligned or the steps of the stair structure are wider than the outward-swing door. One lock may be used to lock the blocking structure to the base structure.

In some embodiments, the blocking structure may comprise one coupling structure 172 in the form of a post which also acts as a blocking structure extending into the swing path of an outward-swing door adjacent thereto for preventing the outward-swing door from opening. One lock may be used to lock the blocking structure to the base structure.

In some embodiments, the blocking structure may comprise two coupling structures 172 and a crossbar extending therebetween. The crossbar may be a straight bar extending between the top ends of the two coupling structures thereby forming a "[" shape blocking structure. Alternatively, the crossbar may be a straight bar extending between corresponding upper portions of the two coupling structures thereby forming an H-shape blocking structure. Yet alternatively, the crossbar may be a curved or bent bar coupled to the top of the two coupling structures thereby forming a U-shape blocking structure. Those skilled in the art will appreciate that the blocking structure may have other suitable shapes in other embodiments. In these embodiments, the coupling structures may extend into the respective elongated hollow body with a sufficient depth. Therefore, only one lock may be used for locking the coupling structures to the elongated hollow bodies.

The crossbar acts as a blocking structure with at least a portion thereof extending into the swing path of an outward-swing door adjacent thereto for preventing the outward-swing door from opening. Such a blocking structure may be used in the RV wherein the steps of the stair structure and the outward-swing door are not aligned or the steps of the stair structure are wider than the outward-swing door. One or two locks may be used to lock the blocking structure to the base structure.

In some embodiments wherein the blocking structure comprises two coupling structures and a crossbar extending therebetween thereby forming a "[" shape or H-shape blocking structure, the crossbar may comprise a sleeve extending from a first one of the two coupling structures and movably receiving therein a bar extending from a second one of the coupling structures for having an adjustable length to adapt to various sizes of the outward-swing doors. One or two locks may be used to lock the blocking structure to the base structure.

In some embodiments, the metal connector is coupled to the bottom of the main housing (directly or through the stair structure or through other suitable components/parts of the main housing), and the one or more elongated hollow bodies may be demountably coupled to the metal connector. A lock may be used for locking each elongated hollow body to the corresponding metal connector.

Herein, the lock is substantively a padlock having a shank or shackle, or is a cable lock having a cable attachable to a lock body. The lock may be a fully mechanical lock or a lock having an electrical circuitry such as a lock with a keypad or a lock with a fingerprint scanner.

Turning now to FIGS. 1A to 2B, a portion of a vehicle according to some embodiments of this disclosure is shown and is generally identified using reference numeral 100. In these embodiments, the vehicle 100 is a recreational vehicle (RV) and comprises a main housing 102 on a chassis (not shown) with wheels 104 for moving. The RV 100 may be a self-propelled vehicle or may be a trailer-type vehicle that requires towing by a self-propelled vehicle for travelling.

The main housing 102 in these embodiments is for user's accommodation and comprises an entrance with an outward-swing door 106 that may outwardly swing about a pivotal end 108 thereof to open. The outward-swing door 106 comprises a handle 110 in proximity to a distal end 112. A door lock (not shown) is installed on or near the handle 110 for locking and unlocking the outward-swing door 106. As described above, the outward-swing door 106 and the lock thereof are usually less secure compared to other door/lock systems.

The main housing 102 may also comprise a stair assembly 114 extending outwardly therefrom below a bottom side of the entrance (also identified using numeral 106) and having one or more steps for a user to step thereon to enter the main housing 102 after the outward-swing door 106 is opened. The steps may be fixed steps. Alternatively, the steps may be retractable under the main housing 102 and extendable therefrom.

In these embodiments, the RV 100 also comprises a security barrier 132 coupled to the main housing 102 about the outward-swing door 106. The security barrier 132 comprises a base structure 134 extending outwardly from the main housing 102 and a blocking structure 138 demountably received in the base structure 134 for blocking the outward-swing door 106 from swinging outwardly to open.

The base structure 134 in these embodiments is a metal, elongated hollow body 142 in the form of a metal sleeve coupled to the bottom wall of the main housing 102 via a metal connector or connecting structure 144. The metal sleeve 142 comprises an elongated bore connecting to a top opening and a bottom opening for receiving therein the blocking structure 138. In these embodiments, the elongated hollow body 142 has a rectangular cross-section. However, those skilled in the art will appreciate that, in various embodiments, the elongated hollow body 142 may have any suitable cross-section such as circle, ellipse, rectangle, triangle, polygon, and/or the like.

Figure 3:
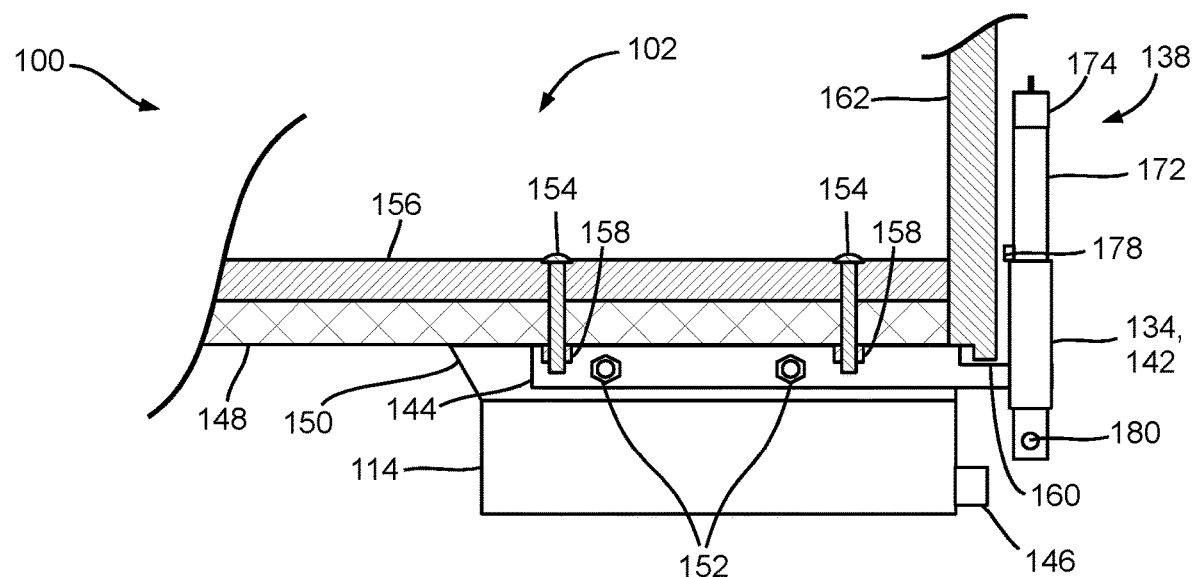
FIG. 3 is a schematic cross-sectional view of a portion of the RV shown in FIG. 1A, illustrating the installation of the security barrier shown in FIG. 1A onto a stair structure under the main housing of the RV by bolting.

FIG. 3 is a cross-sectional view of a portion of the RV 100. In this example, the stair assembly 114 comprises one extendable step 146 and is coupled to a metal bracket 150 via a plurality of stair-mounting bolts 152. A plurality of bracket-mounting screws or bolts 154 extend through the floor 156 and the bottom wall 148 to the metal bracket 150 and engage respective nuts 156 to couple the metal bracket 150 and thus the stair assembly 114 to the bottom wall 148 of the main housing 102.

The metal connector 144 of the security barrier 132 in these embodiments is a flat metal bar having a notch 160 at a front side thereof adjacent the metal sleeve 142 for adapting to the siding of the RV 100. The metal connector 144 also comprises a plurality of holes (not shown) at locations corresponding to the stair-mounting bolts 152 such that the stair-mounting bolts 152 may also be used for coupling the metal connector 144 and thus the security barrier 132 to the stair assembly 114 (or more specifically to the metal bracket 150 thereof) and to the main housing 102 of the RV 100. After installation, the base structure 134 is located adjacent the sidewall 162 of the main housing 102 at a position outside the swing path of the outward-swing door 106 so as to avoid interference with the outward swinging thereof.

Figure 2A:
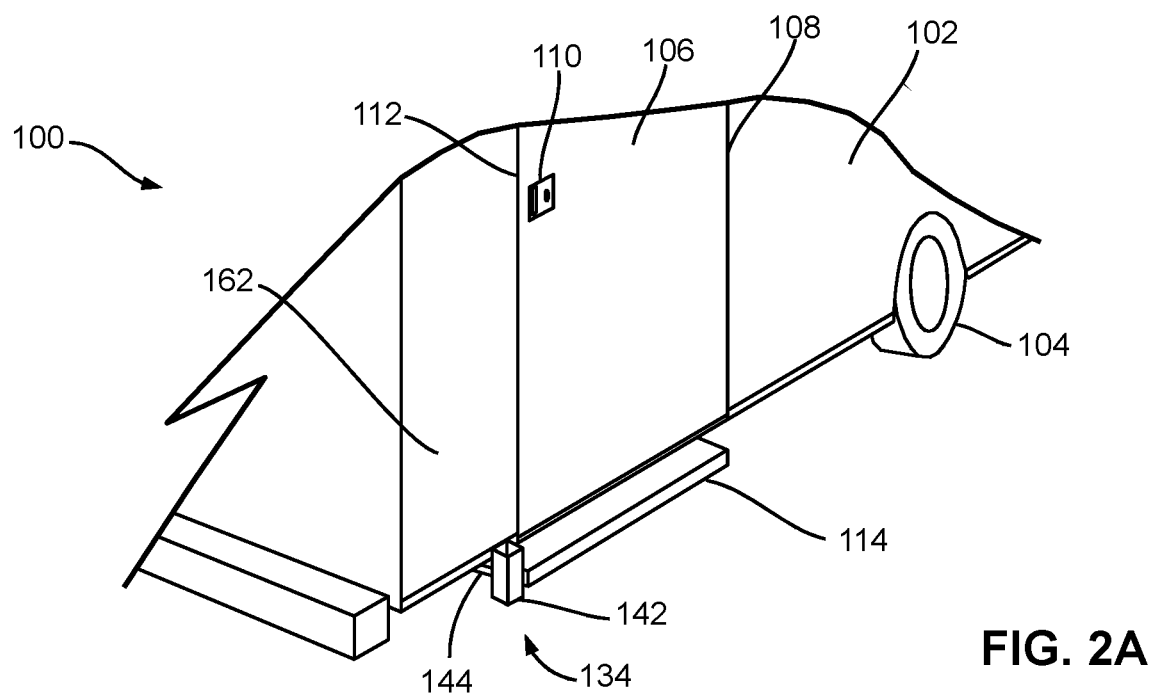
FIG. 2A is a perspective view of a portion of the RV shown in FIG. 1A with the blocking structure of the security barrier shown in FIG. 1A demounted, allowing the outward-swing door to open.
Figure 2B:
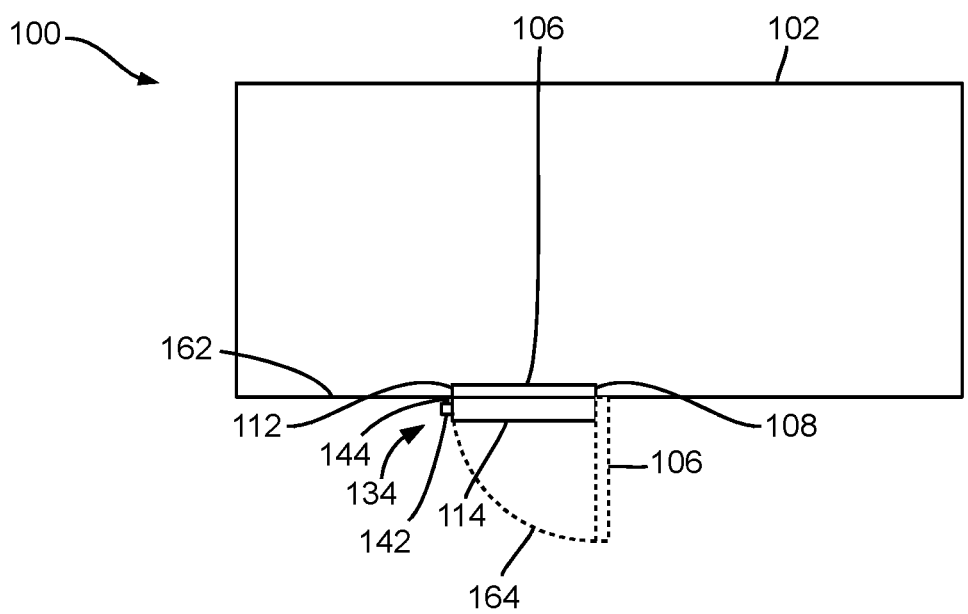
FIG. 2B is a plan view of the RV shown in FIG. 2A, illustrating the base structure of the security barrier shown in FIG. 1A located outside the swing path of the outward-swing door so as to not interfere with the opening of the outward-swing door.

For example, as shown in FIG. 3, the base structure 134 may be positioned outside the swing path of the outward-swing door 106 by configuring the top of the base structure 134 to be flush or lower than the bottom of the outward-swing door 106. As shown in FIGS. 2A and 2B, the base structure 134 may also or alternatively be located at a position adjacent the main housing 102 and further distal to the distal end 112 of the outward-swing door 106 at the closed position (i.e., with a distance to the pivotal end 108 greater than the width of the outward-swing door 106) so as to maintain the base structure 134 outside the swing path 164 of the outward-swing door 106.

As shown in FIGS. 1A, 1B, 3, and 4, the blocking structure 138 in these embodiments is a T-shape metal structure having a coupling structure 172 in the form of a post (hollow or with a solid core) for inserting into the metal sleeve 142 and a longitudinal crossbar 174 substantively perpendicularly extending from the top of the post 172 along opposite directions for preventing the outward-swing door 106 from opening. In these embodiments, the blocking structure 138 also comprises a handle 176 coupled to the top surface of the crossbar 174 for facilitating a user to lift the crossbar 174.

The coupling structure 172 has a cross-section substantively corresponding to that of the elongated hollow body 142 and comprises a stopper 178 in the form of a protrusion extending from a surface thereof parallel to a longitudinal axis of the crossbar 174, for engaging the top edge of the metal sleeve 142 for delimiting the vertical position of the blocking structure 138 with respect to the metal sleeve 142. The coupling structure 172 also comprises a locking structure 180 in the form of a locking hole for receiving a lock to lock the blocking structure 138 to the base structure 134.

Referring again to FIGS. 1A and 1B, to secure the outward-swing door 106, one may insert the blocking structure 138 into the metal sleeve 142 with the longitudinal axis of the crossbar 174 substantively parallel to the sidewall 162 of the main housing 102 and preferably with the protrusion 178 facing the main housing 102. The blocking structure 138 is then positioned adjacent the sidewall 162 of the main housing 102 with a portion of the crossbar 174 extending into the swing path 164 of the outward-swing door 106, thereby preventing the outward-swing door 106 from opening. One may lock the blocking structure 138 to the base structure 134 by extending the shank or shackle of a padlock (not shown) through the locking structure 180 and then configuring the padlock to a locked configuration. Those skilled in the art will appreciate that other locks such as cable locks may also be used for locking the blocking structure 138 to the base structure 134. The outward-swing door 106 is then prevented from opening and the access to the interior of the main housing 102 of the RV 100 is disabled with enhanced security.

To enable the access to the interior of the main housing 102 of the RV 100, one may configure the lock to an unlocked configuration, remove the lock, and remove the blocking structure 138 from the base structure 134. The outward-swing door 106 is then allowed to open.

The security barrier 132 provides a physical barrier to prevent the opening of the outward-swing door 106 when the blocking structure 138 is coupled and locked to the base structure 134, thereby increasing the security of the RV 100. Moreover, the security barrier 132 also acts as a warning sign and provides a psychological barrier to potential intruders.

Those skilled in the art will appreciate that alternative embodiments are readily available. For example, although in above embodiments the security barrier 132, including the base structure 134 and the blocking structure 138 thereof, is made of a metal such as steel, in some alternative embodiments, at least some components of the security barrier 132 may be made of other suitable material such as rigid plastic and/or other non-malleable material. Those skilled in the art will also appreciate that the components of the security barrier 132 may be made of above-described material with sufficient thickness and sizes for providing required strength against potential damages or vandalism.

In above embodiments, the protrusions 178 are permanently coupled to the coupling structures 172. In some embodiments, the coupling structure 172 may comprise a plurality of holes distributed thereon along a longitudinal axis thereof. The protrusion 178 may be a sheet-metal screw or an insert that may be removably inserted into one of the plurality of holes for setting a height of the blocking structure 138.

Figure 5:
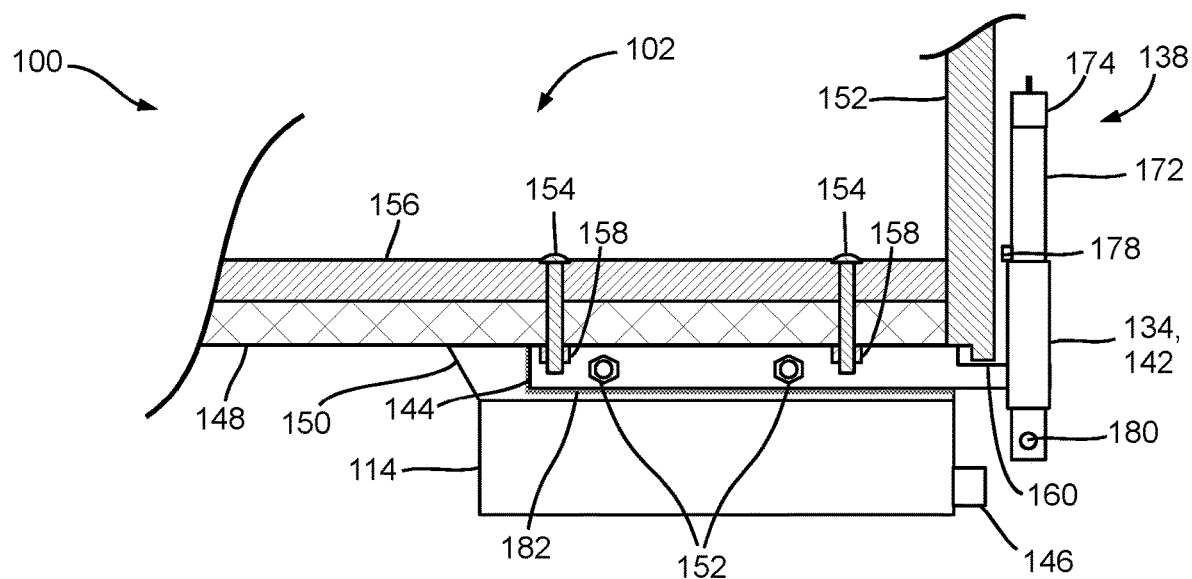
FIG. 5 is a schematic cross-sectional view of a portion of the RV shown in FIG. 1A, illustrating the installation of the security barrier shown in FIG. 1A onto a stair structure under the main housing of the RV by welding, according to some embodiments of this disclosure.

Although in above embodiments the metal connector 144 is coupled to the metal bracket 150 of the stair assembly 114 by using the bolts 152, in some embodiments as shown in FIG. 5, the metal connector 144 may be coupled to the metal bracket 150 of the stair assembly 114 by welding 182.

Although in above embodiments the metal connector 144 is coupled to the metal bracket 150 of the stair assembly 114, in some embodiments, the metal connector 144 may be a metal bracket and directly coupled to the bottom wall 148 of the main housing 102 by suitable fastening means such as screwing, bolting, welding, clamping, and/or the like.

In some embodiments, the blocking structure 138 of the security barrier 132 may not comprise the handle 176.

Although in above embodiments, the base structure 134 of the security barrier 132 is a metal sleeve, in some embodiments, the base structure 134 may be a metal pocket with a bottom wall and an elongated bore connecting to a top opening. In these embodiments, the metal pocket may comprise holes on the sidewall thereof corresponding to the locking hole 180 of the blocking structure 138 for locking the blocking structure 138 to the base structure 134 using a lock.

As described above, the base structure 134 of the security barrier 132 is generally located outside the swing path 164 of the outward-swing door 106 and at least a portion of the blocking structure 138 extends into the swing path 164 thereof.

Figure 6:
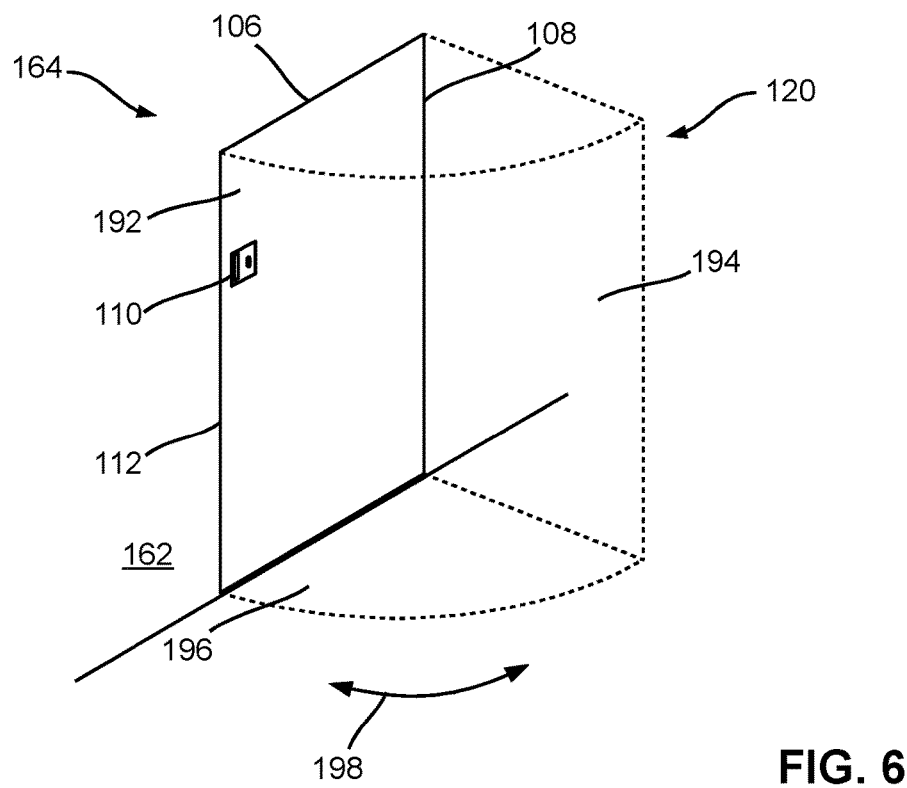
FIG. 6 is a schematic perspective view of the outward-swing door of the RV shown in FIG. 7, illustrating the swing path thereof.

FIG. 6 is a schematic perspective view of the outward-swing door 106 showing the swing path 164 thereof. As shown, the outward-swing door 106 may swing outwardly about the pivotal end 108 along the swing path 164 between a closed position 192 and an open position 194. The swing path 164 of the outward-swing door 106 thus occupies a three-dimensional (3D) space having a cylindrical-sector shape with a sectoral cross-section 196 parallel to the swing direction 198 thereof and a height generally the same as that of the outward-swing door 106.

The base structure 134 of the security barrier 132 may be located at any suitable location outside the main housing 102 (i.e., external to the sidewall 162 thereof) and outside the cylindrical-sector-shaped 3D space 164. Preferably, the base structure 134 of the security barrier 132 is coupled to the bottom of the main housing 102 either directly or via another component such as the stair structure 104 coupled thereto. Compared to installing the base structure 134 to other places of the main housing 102 such as the sidewall 162 or the top wall thereof, it is usually more flexible to find a place of the bottom wall 148 of the main housing 102 with sufficient strength for supporting the security barrier 132 coupled thereto. Compared to other locations of the main housing 102, the bottom wall of the main housing 102 may provide stronger support to the security barrier 132.

Moreover, compared to installing the base structure 134 to the bottom of the main housing 102, installing the base structure 134 to other places of the main housing 102 may face risks of water ingress through the holes drilled to the main housing for the base-structure installation and extra care in design and manufacturing may be required for preventing water damage.

In some embodiments, the security barrier 132 and in particular, the base structure 134 may preferably have a low profile for facilitating the aesthetic design of the RV 100. Installing the base structure 134 to other places of the main housing 102 often interferes with the aesthetic design of the RV 100.

FIGS. 7 to 10B show some examples of the location of the base structure 134.

Figure 7:
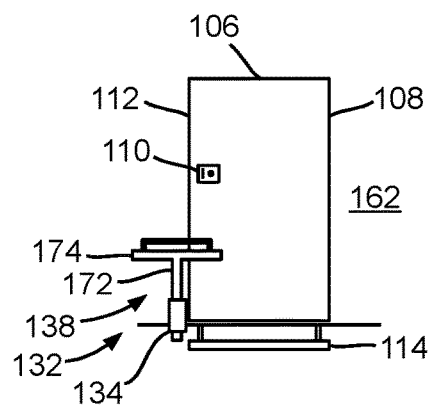
FIG. 7 is a front view of a portion of the RV shown in FIG. 1A showing the security barrier installed about a distal end of the outward-swing door, according to some embodiments of this disclosure.

In some embodiments as shown in FIG. 7, the base structure 134 may be located adjacent the distal end 112 of the outward-swing door 106 about the bottom thereof and with a distance to the pivotal end 108 of the outward-swing door 106 greater than the width thereof. In these embodiments, the top of the base structure 134 may be higher than the bottom of the outward-swing door 106.

Figure 8A:
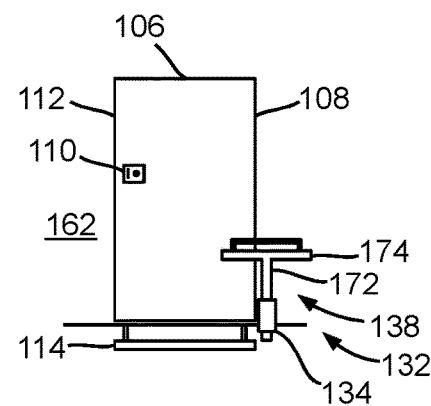
FIGS. 8A and 8B are front and plan views, respectively, of a portion of the RV shown in FIG. 1A showing the security barrier installed about a pivotal end of the outward-swing door, according to yet some embodiments of this disclosure.
Figure 8B:
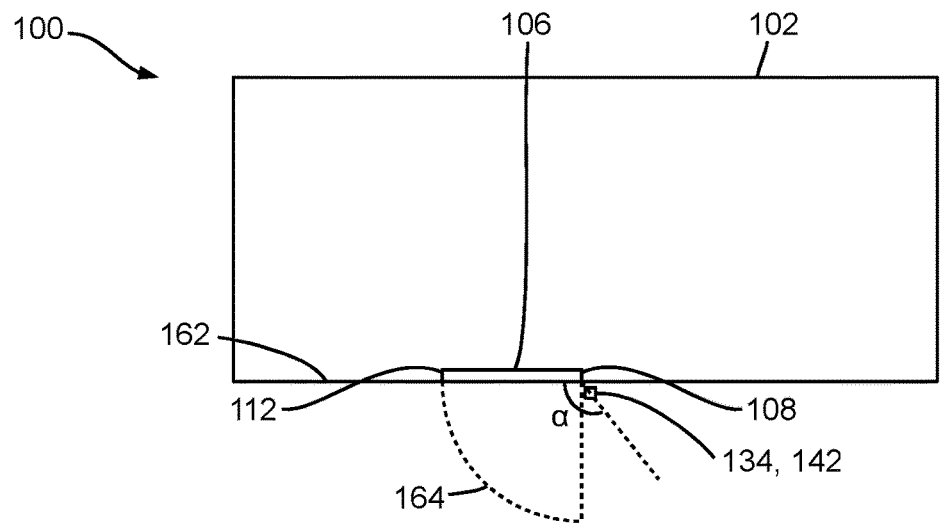

In some embodiments as shown in FIGS. 8A and 8B, the base structure 134 may be located adjacent the pivotal end 108 of the outward-swing door 106 about the bottom thereof and with an angle $\alpha$ to the distal end 112 of the outward-swing door 106 with respect to the pivotal end 108 thereof that is greater than or equal to 90° and smaller than or equal to 180°, i.e., $90° \leq \alpha \leq 180°$. In these embodiments, the top of the base structure 134 may be higher than the bottom of the outward-swing door 106.

Figure 9:
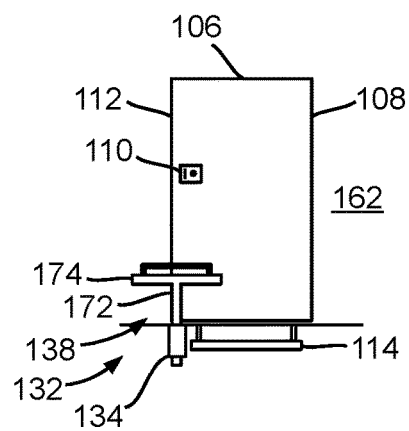
FIG. 9 is a front view of a portion of the RV shown in FIG. 1A showing the security barrier installed about a distal end of the outward-swing door at a position therebelow, according to still some embodiments of this disclosure.

In some embodiments as shown in FIG. 9, the width of the stair structure 114 is smaller than that of the outward-swing door 106. The base structure 134 may be located beside the stair structure 114 at a position between the pivotal end 108 and the distal end 112 of the outward-swing door 106 (e.g., with a distance to the pivotal end 108 of the outward-swing door 106 smaller than the width thereof) and with an elevation below the bottom thereof.

Figure 10A:
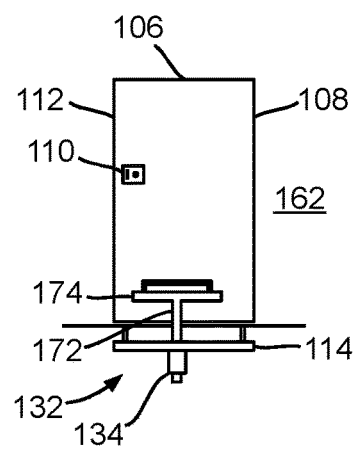
FIGS. 10A and 10B are front and schematic cross-sectional views, respectively, of a portion of the RV shown in FIG. 1A showing the security barrier installed between the distal end and a pivotal end of the outward-swing door at a position therebelow, according to yet some embodiments of this disclosure.
Figure 10B:
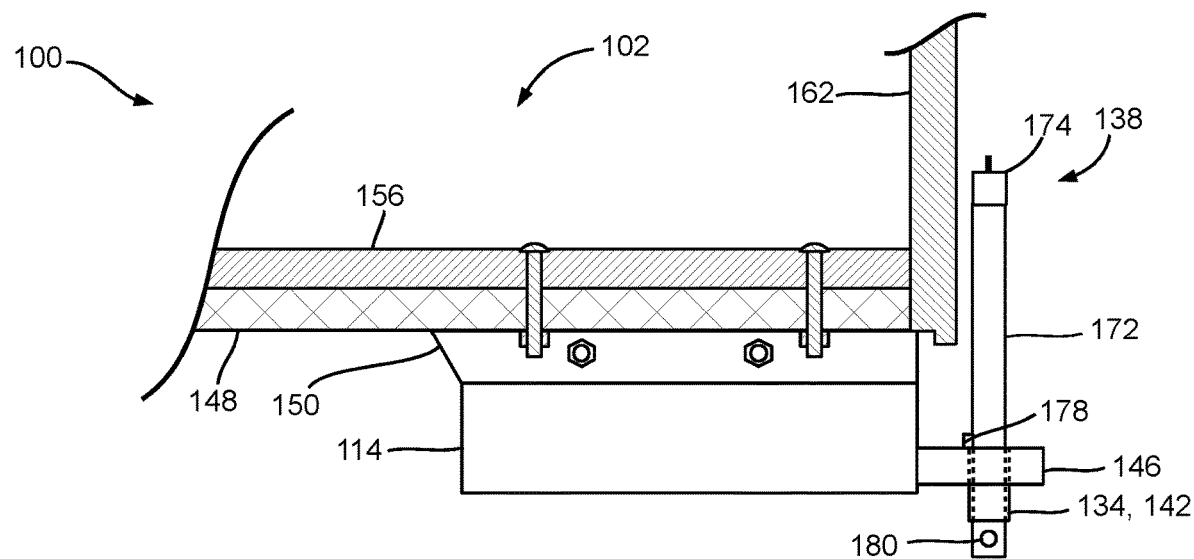

In some embodiments as shown in FIGS. 10A to 10C, the base structure 134 may be coupled to the stair structure 114 such as a topmost step 146 thereof with the top of the base structure 134 flush with that of the topmost step 146. In these embodiments, the base structure 134 may be located in the topmost step 146 at any suitable position between the pivotal end 108 and the distal end 112 of the outward-swing door 106, e.g., with a distance to the pivotal end 108 of the outward-swing door 106 smaller than the width thereof.

Figure 11A:
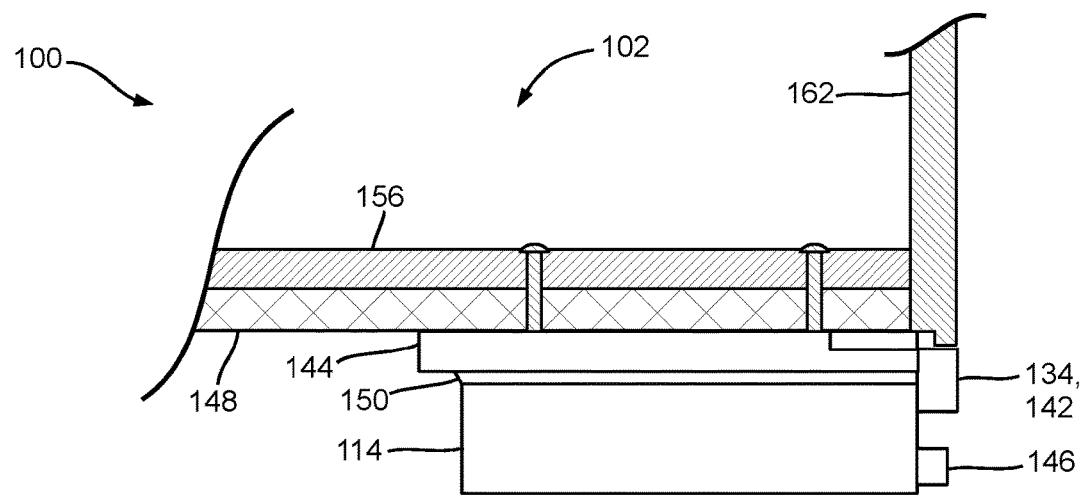
FIGS. 11A and 11B are schematic cross-sectional views of a portion of the RV shown in FIG. 1A showing the security barrier installed in the stair structure and extendable/retractable therewith, according to yet some embodiments of this disclosure.
Figure 11B:
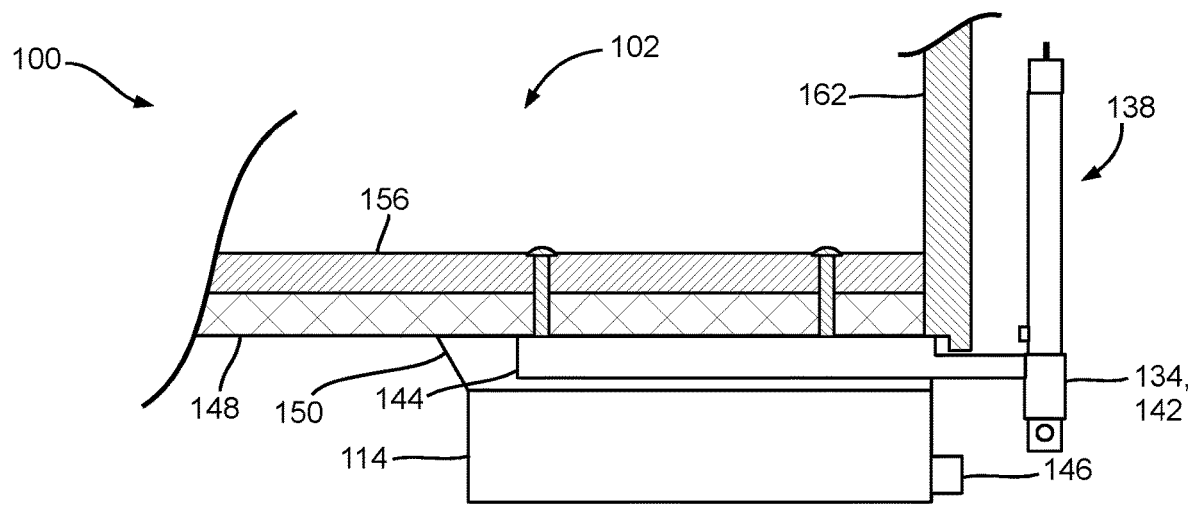

In some embodiments, the base structure 134 may be retractable to under the main housing 102 when it is not in use (see FIG. 11A) and may be extended out for receiving the blocking structure 138 for preventing the outward-swing door 106 from opening (see FIG. 11B).

Those skilled in the art will appreciate that the blocking structure 138 may be designed in any suitable manner in various embodiments as long as a portion or all of the blocking structure 138 extends into the swing path 164. For example, in some embodiments, the T-shaped blocking structure 138 may not be parallel to the sidewall 162 of the main housing 102 and may be at an angle thereto greater than 0° and smaller than 180°. In some embodiments, while at least a portion of the blocking structure 138 is within the swing path 196, the top of the blocking structure 138 may extend above the top of the outward-swing door 106.

Generally, the distance between the blocking structure 138 and the outward-swing door 106, measured from the point of the blocking structure 138 closest to the outward-swing door 106 (denoted "representative point" of the blocking structure 138 hereinafter), is smaller than or equal to a maximum value determined by the requirement of a predefined extent that the outward-swing door 106 may slightly open without allowing an intruder to access therethrough, when the blocking structure 138 is locked in the base structure 134.

Figure 12:
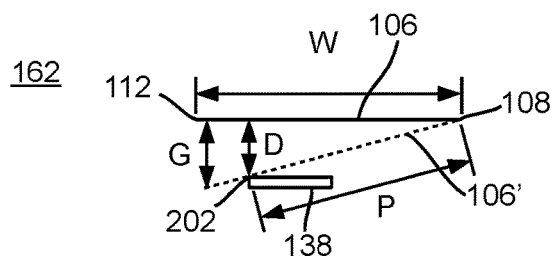
FIG. 12 is a schematic diagram showing the maximum distance between the security barrier and the outward-swing door in a closed configuration.

As shown in FIG. 12, the outward-swing door 106 has a width of W and the representative point 202 of the blocking structure 138 is at a distance P to the pivotal end 108 of the outward-swing door 106. When the blocking structure 138 is locked in the base structure 134, the outward-swing door 106 is allowed to open to a maximum position 106' such that the distance (denoted an "opening gap" hereinafter) of the distal end 112 thereof to the closed position thereof (or the sidewall 162) is G. Then, the blocking structure 138 may be configured such that the distance D of the representative point 202 thereof to the closed position of outward-swing door 106 (or the sidewall 162) is D≤GP/W.

Figure 4:
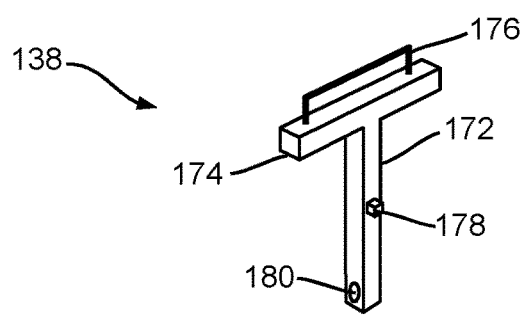
FIG. 4 is a perspective view of the blocking structure of the security barrier shown in FIG. 1A, the blocking structure having a T-shape.
Figure 13:
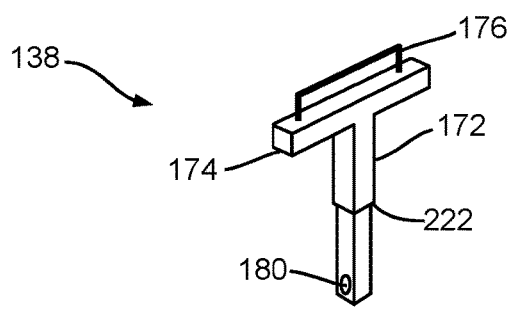
FIG. 13 is a perspective view of a T-shape blocking structure of the security barrier shown in FIG. 1A, according to some embodiments of this disclosure, the blocking structure having a downward facing stop shoulder.
Figure 14:
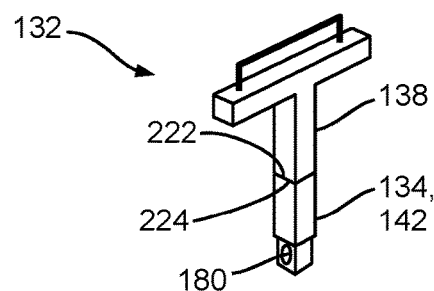
FIG. 14 is a perspective view of the blocking structure shown in FIG. 13 coupled to the base structure.

FIG. 13 shows a blocking structure 138 in some embodiments which is similar to that shown in FIG. 4. However, the blocking structure 138 in these embodiments does not comprise any protrusion 178. Rather, the upper portion of the coupling structure 172 has a cross-sectional dimension greater than that of the lower portion thereof, thereby forming a downwardly facing stop shoulder 222 for engaging the top edge 224 of the elongated hollow body 142 of the base structure 134 for delimiting the vertical position of the blocking structure 138 in the elongated hollow body 142 (see FIG. 14).

Figure 15:
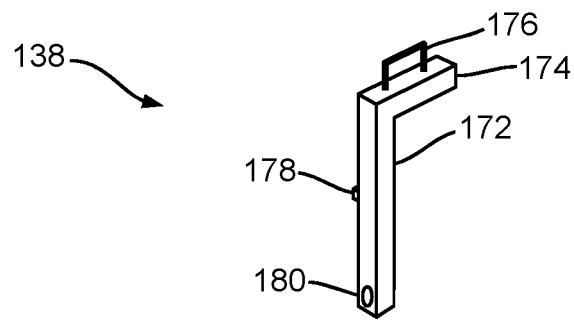
FIG. 15 is a perspective view of an L-shape blocking structure of the security barrier shown in FIG. 1A, according to some embodiments of this disclosure.

FIG. 15 shows a blocking structure 138 in some embodiments. The blocking structure 138 in these embodiments is similar to that shown in FIG. 4 except that the longitudinal crossbar 174 and the coupling structure 172 form an L-shape. In other words, the crossbar 174 extends from the top end of the coupling structure 172 at substantively 90°.

Figure 16:
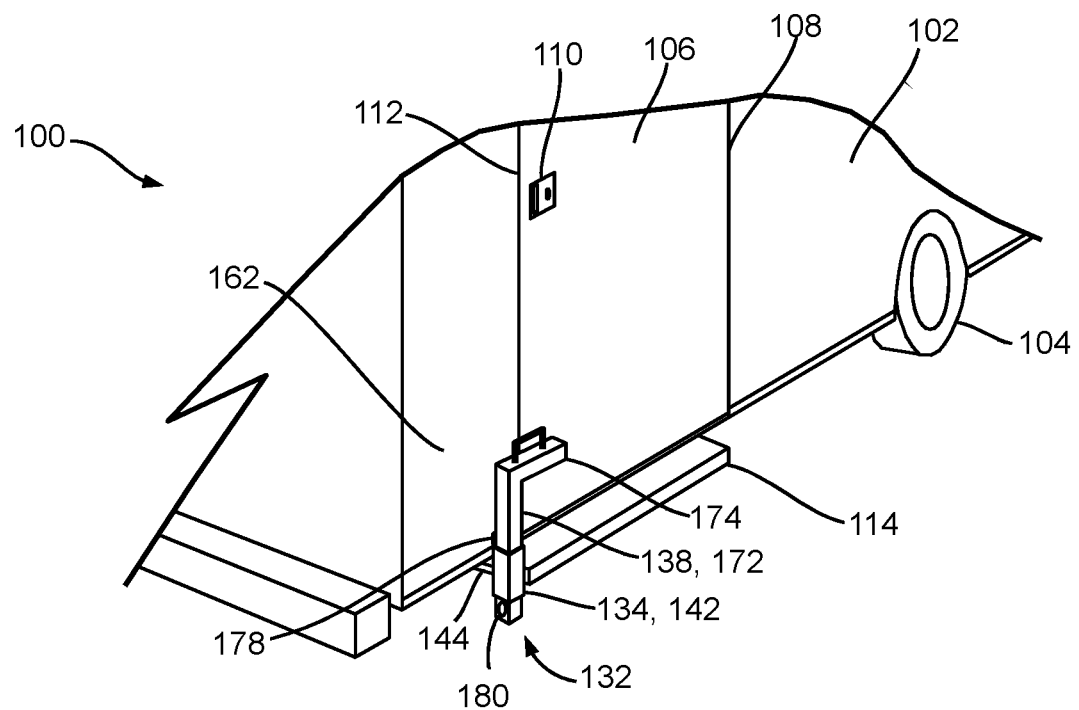
FIG. 16 is a perspective view of a portion of the RV shown in FIG. 1A with the blocking structure shown in FIG. 15 installed thereto.

FIG. 16 shows the blocking structure 138 installed into the base structure 134. As shown, the blocking structure 138 in these embodiments is directional as the crossbar 174 is required to extend into the swing path 164 (not shown). In one embodiment, the user is required to manually set up the orientation or direction of the blocking structure 138 when installing it into the base structure 134. In another embodiment, the coupling structure 172 of the blocking structure 138 and the elongated hollow body 142 of the base structure 134 have matching but unsymmetrical cross-sections such that the blocking structure 138 may only be installed into the base structure 134 at a predefined orientation/direction. In yet another embodiment, the elongated hollow body 142 of the base structure 134 comprises a notch (not shown) matching the position of the protrusion 178 allowing the protrusion 178 to slide thereinto only when the blocking structure 138 is installed into the base structure 134 at a predefined orientation/direction.

Figure 17:
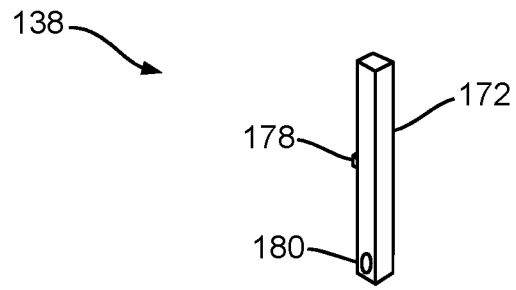
FIG. 17 is a perspective view of a blocking structure of the security barrier shown in FIG. 1A in the form of a straight bar, according to yet some embodiments of this disclosure.

FIG. 17 shows a blocking structure 138 in some embodiments. The blocking structure 138 in these embodiments is similar to that shown in FIG. 15 except that the blocking structure 138 in these embodiments does not comprise a longitudinal crossbar 174 or the handle 176.

Figure 18:
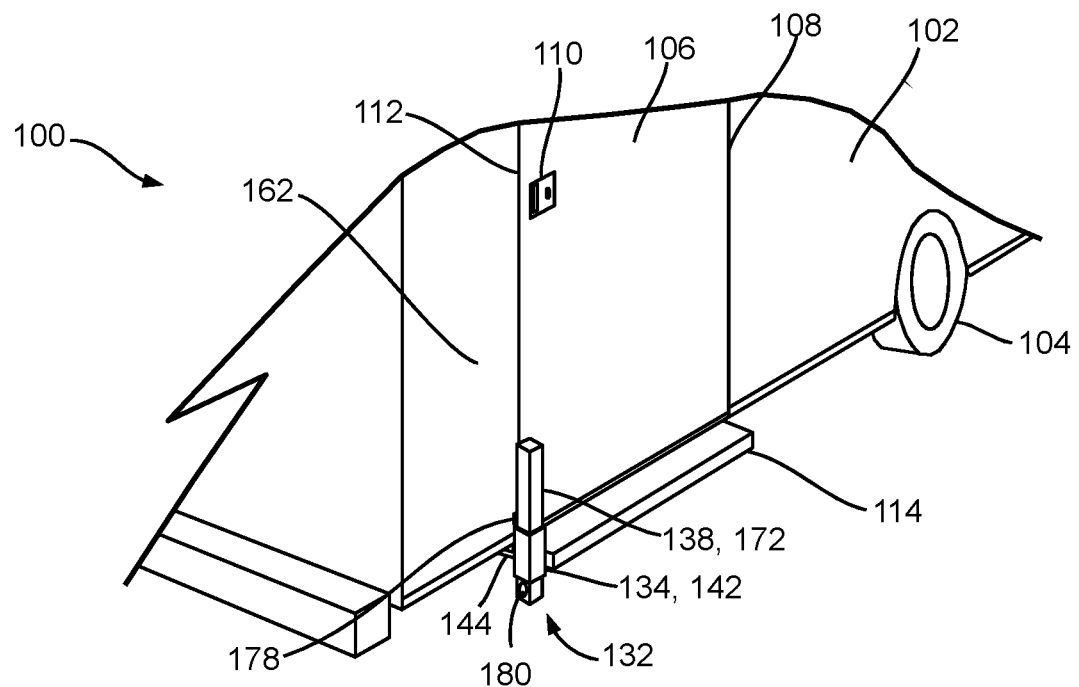
FIG. 18 is a perspective view of a portion of the RV shown in FIG. 1A with the blocking structure shown in FIG. 17 installed thereto.

FIG. 18 shows the blocking structure 138 installed into the base structure 134. As shown, the base structure 134 in these embodiments is located between the pivotal end 108 and the distal end 112 of the outward-swing door 106 at an elevation below the bottom thereof to allow the blocking structure 138 extend into the swing path 164 (not shown).

Figure 19:
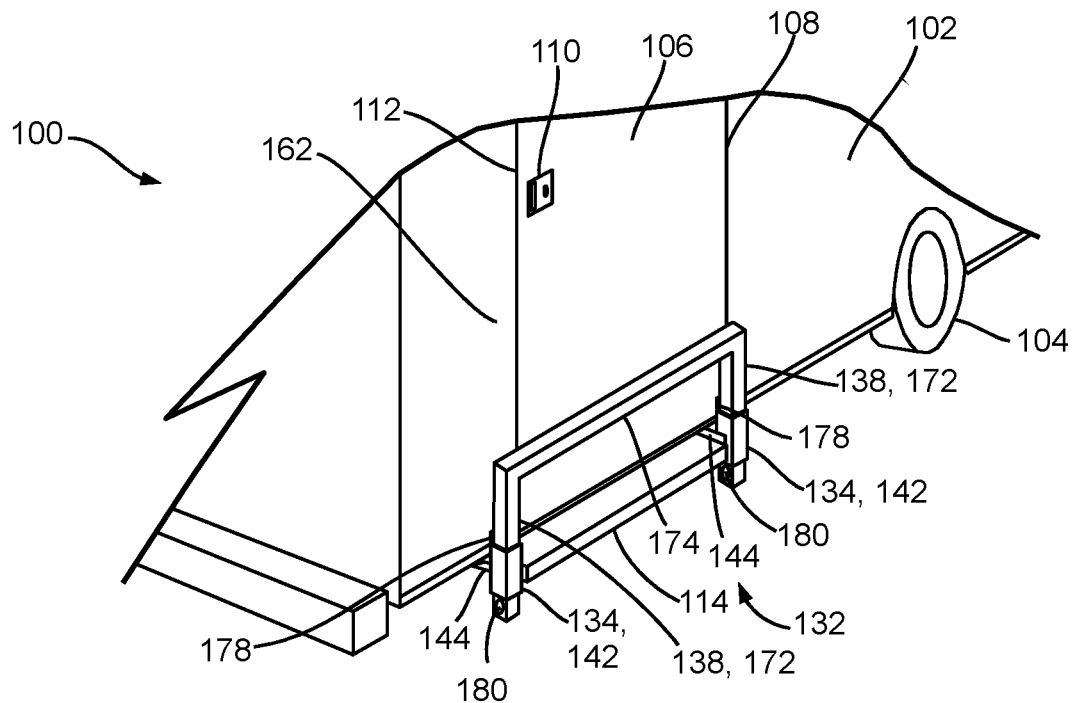
FIG. 19 is a perspective view of a portion of the RV shown in FIG. 1A with a security barrier installed thereto, according to some embodiments of this disclosure, the blocking structure of the security barrier having a "[" shape with a straight crossbar.
Figure 20:
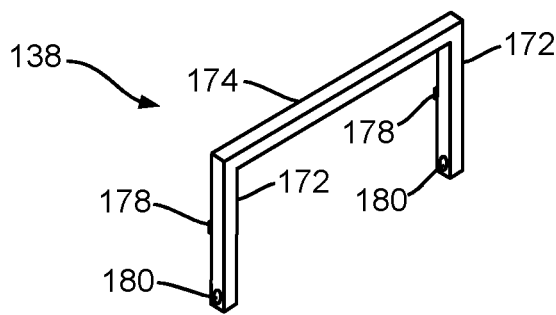
FIG. 20 is a perspective view of the blocking structure shown in FIG. 19.

FIG. 19 shows a vehicle 100 such as a RV having a security barrier 132 for preventing the outward-swing door 106 from opening. The security barrier 132 comprises a base structure 134 and a blocking structure 138. In these embodiments, the base structure 134 comprises two metal sleeves 142 each coupled to the bottom of the main housing 102 via a respective metal bar 144 in a manner similar as described above. As shown in FIG. 20, the blocking structure 138 in these embodiments comprises two coupling structures 172 for inserting into respective metal sleeves 142 and each comprising a stopper 178 similar to that described above. A longitudinal crossbar 174 extends between the top ends of the two coupling structures 172 thereby forming a blocking structure 138 with a "[" shape.

Figure 21:
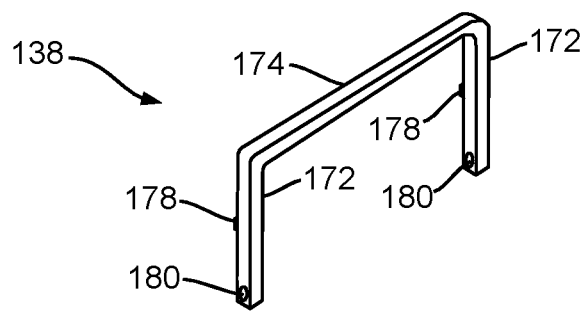
FIG. 21 is a perspective view of a blocking structure of the security barrier shown in FIG. 1A in the form of a straight bar, according to yet some embodiments of this disclosure, the blocking structure of the security barrier having a "[" shape with round corners.

In the embodiments shown in FIGS. 19 and 20, the longitudinal corners between the crossbar 174 and the coupling structures 172 are right-angle corners. In some embodiments shown in FIG. 21, the corners between the crossbar 174 and the coupling structures 172 may be round corners.

Figure 22:
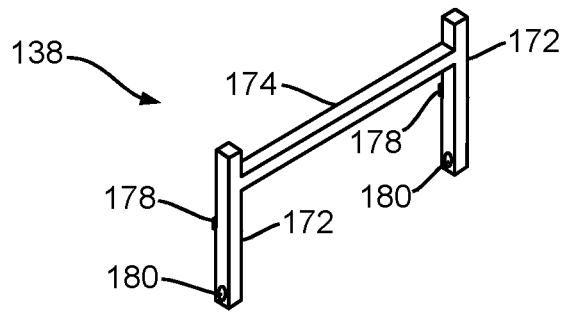
FIG. 22 is a perspective view of an H-shape blocking structure of the security barrier shown in FIG. 1A, according to yet some embodiments of this disclosure.

FIG. 22 shows a blocking structure 138 in some embodiments. The blocking structure 138 in these embodiments is similar to that shown in FIG. 20 except that the crossbar 174 in these embodiments extends between corresponding upper portions of the two coupling structures 172 thereby forming an H-shape blocking structure 138 for use with the base structure 134 shown in FIG. 19.

Figure 23:
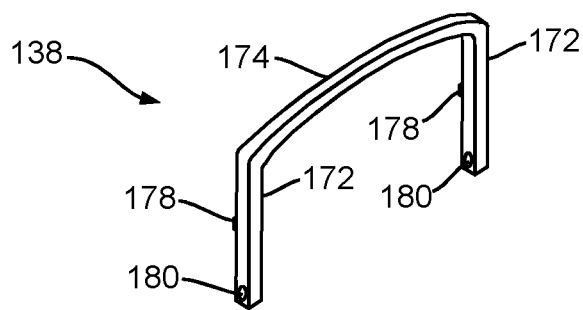
FIG. 23 is a perspective view of a U-shape blocking structure of the security barrier shown in FIG. 1A having a curved crossbar, according to yet some embodiments of this disclosure.

FIG. 23 shows a blocking structure 138 in some embodiments. The blocking structure 138 in these embodiments is similar to that shown in FIG. 20 except that the crossbar 174 in these embodiments is a curved bar thereby forming a U-shape blocking structure 138 for use with the base structure 134 shown in FIG. 19.

In the embodiments shown in FIGS. 19 to 23, the blocking structure 138 has a fixed width and may not be able to adapt to different sizes of the outward-swing doors 106.

Figure 24:
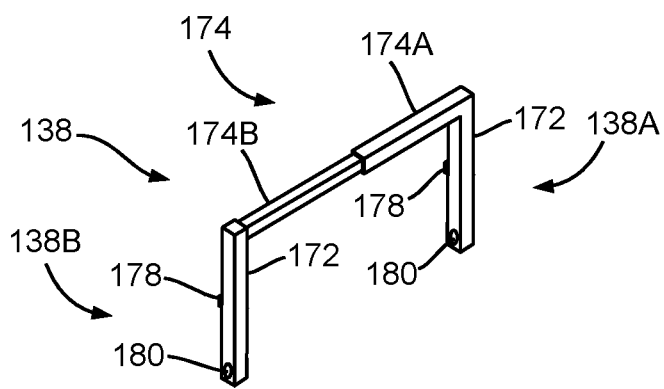
FIG. 24 is a perspective view of a blocking structure of the security barrier shown in FIG. 1A having a length-adjustable crossbar, according to yet some embodiments of this disclosure.

FIG. 24 shows a blocking structure 138 in some embodiments. As shown, the blocking structure 138 comprises a length-adjustable crossbar 174. In particular, the blocking structure 138 comprises a first portion 138A having a coupling structure 172 and a first crossbar 174A horizontally extending therefrom and a second portion 138B having a coupling structure 172 and a second crossbar 174B horizontally extending therefrom.

The first crossbar 174A of the first portion 138A is a metal sleeve suitable for movably receiving therein the second crossbar 174B. Therefore, the width of the blocking structure 138 in these embodiments may be adjusted by sliding the second crossbar 174B in the first crossbar 174A for adapting to different sizes of the outward-swing doors 106.

Although in embodiments shown in FIGS. 19 to 24, the blocking structure 138 comprises two locking holes 180 (each on a coupling structure 172), in some embodiments, the blocking structure 138 only comprise one locking hole 180 on either one of the two coupling structures 172.

In some embodiments, the RV 100 may comprise one or more handles and the one or more elongated hollow bodies 142 may be coupled to respective handles.

In above embodiments, the blocking structure 138 are shown as being formed by cubical bars or tubes (i.e., having a rectangular cross-section) which may be a hollow bar or a bar with a solid core. In some embodiments, the block structure 138 may be formed by bars or tubes of other suitable cross-sections such as triangle, pentagon, hexagon, circle, and/or the like.

Figure 25:
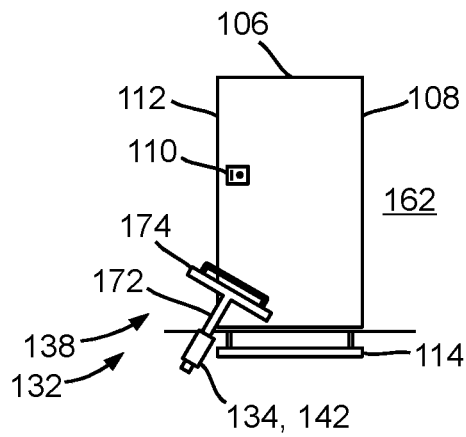
FIG. 25 is a front view of a portion of the RV shown in FIG. 1A showing the security barrier installed about a distal end of the outward-swing door with an oblique orientation, according to some embodiments of this disclosure.
Figure 26:
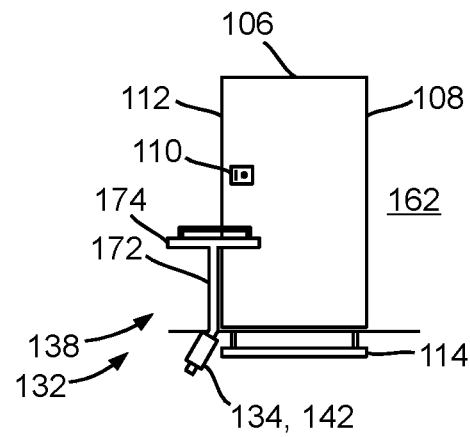
FIG. 26 is a front view of a portion of the RV shown in FIG. 1A showing the security barrier installed about a distal end of the outward-swing door with the base structure in an oblique orientation, according to some embodiments of this disclosure.

In above embodiments, the elongated hollow bodies 142 are arranged in a substantively upright orientation. In some embodiments, the elongated hollow bodies 142 may be arranged in any suitable orientation. For example, in some embodiment as shown in FIGS. 25 and 26, the elongated hollow body 142 of the base structure 134 may be arranged in an oblique orientation. Correspondingly, the blocking structure 138 (FIG. 25) or at least a portion of the coupling structure 172 thereof (FIG. 26) is arranged in a similar orientation matching that of the blocking structure 138.

Figure 27:
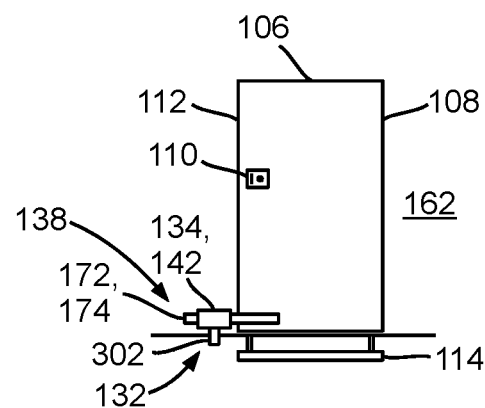
FIG. 27 is a front view of a portion of the RV shown in FIG. 1A showing the security barrier installed about a distal end of the outward-swing door, according to some embodiments of this disclosure, the blocking structure of the security barrier only comprising a straight crossbar that also acts as a coupling structure.

In some embodiment as shown in FIG. 27, the base structure 132 comprises a metal sleeve 142 with the elongated bore thereof arranged in a substantively horizontal orientation. Correspondingly, the blocking structure 138 only comprises a crossbar 174 also acting as a coupling structure 172 extendable into the horizontally-oriented metal sleeve 142 for blocking the opening of the outward-swing door 106. A lock may be used for locking the crossbar 174 to the metal sleeve 142 as described above.

In above embodiments wherein the blocking structure 138 comprises a crossbar, the crossbar 174 extends from the corresponding coupling structure 172 at substantively 90°. In some embodiments, the crossbar 174 may extend from the corresponding coupling structure 172 at an acute or obtuse angle.

In above embodiments, the crossbar 174 is made of a rigid material. In some alternative embodiments, the crossbar 174 may have limited flexibility. For example, in an embodiment similar to that shown in FIG. 19 wherein the blocking structure 138 comprises two coupling structures 172, the crossbar 174 may be a metal chain with sufficient strength against potential vandalism and sufficiently tensioned between the two coupling structures 172 to prevent the outward-swing door 106 from opening with an opening gap greater than G (see FIG. 12).

Although in above embodiments, the security barrier 132 is used for improved security of RVs, in some embodiments, the security barrier 132 may be used for improved security of other suitable vehicles such as trailers, buses, and the like that have outward-swing doors.

Those skilled in the art will appreciate that the security barrier 132 described above may be coupled to the vehicle 100 as part of the manufacturing process. Alternatively, the security barrier 132 described above may be installed as an add-on device to an already-manufactured vehicle 100.

Although embodiments have been described above with reference to the accompanying drawings, those of skill in the art will appreciate that variations and modifications may be made without departing from the scope thereof as defined by the appended claims.

What is claimed is:

1. An apparatus for providing improved security to an outward-swing door of a vehicle, said outward-swing door on a sidewall of a main housing of the vehicle and having a pivotal end and a distal end opposite to the pivotal end, said outward-swing door outwardly pivotable about the pivotal end thereof, the apparatus comprising:
    a connecting structure for coupling to a stair assembly of the vehicle, on an underside the main housing of the vehicle;
    a base structure for coupling to the connecting structure and locating adjacent the outward-swing door and outside a swing path of the outward-swing door; and
    a blocking structure demountably coupled to the base structure, at least a portion thereof extendable into the swing path of the outward-swing door for restricting the outward-swing door to open to a predefined maximum extent.

2. The apparatus of claim 1, wherein the connecting structure is for directly coupling to the stair assembly on the underside of the main housing by one or more bolts that also couple the stair assembly to the main housing of the vehicle.

3. The apparatus of claim 1, wherein the base structure is located adjacent the distal end of the outward-swing door at a distance to the pivotal end thereof greater than a width of the outward-swing door.

4. The apparatus of claim 1, wherein the base structure is located adjacent the pivotal end of the outward-swing door with an angle $\alpha$ to the distal end thereof with respect to the pivotal end thereof, and $90°\leq\alpha\leq180°$.

5. The apparatus of claim 1, wherein the base structure is located adjacent the pivotal end of the outward-swing door and below a bottom thereof.

6. The apparatus of claim 1, wherein the base structure comprises at least one elongated hollow body having at least one opening for demountably receiving the blocking structure.

7. The apparatus of claim 6, wherein the at least one of the at least one elongated hollow body comprises a bottom wall.

8. The apparatus of claim 6, wherein the blocking structure comprises at least one coupling structure for demountably coupling to the base structure.

9. The apparatus of claim 8, wherein each of the at least one coupling structure is a post receivable in a corresponding one of the at least one elongated hollow body.

10. The apparatus of claim 9, wherein said post comprises a stopper for delimiting a position of the post with respect to the elongated hollow body.

11. The apparatus of claim 10, wherein said stopper is a protrusion extending from the post or a downwardly facing stop shoulder on the post.

12. The apparatus of claim 9, wherein the blocking structure further comprises a crossbar extending from the at least one coupling structure.

13. The apparatus of claim 12, wherein the crossbar is a curved bar.

14. The apparatus of claim 12, wherein the blocking structure comprise only one coupling structure; and wherein the crossbar extends from the top of the coupling structure along opposite directions thereby forming a T-shape or an L-shape blocking structure.

15. The apparatus of claim 12, wherein said post is also the crossbar horizontally extendable into the at least one elongated hollow body.

16. The apparatus of claim 12, wherein the blocking structure comprise two coupling structures; and wherein the crossbar extends between the top ends of the two coupling structures thereby forming a blocking structure with a "[" shape.

17. The apparatus of claim 12, wherein the blocking structure comprise two coupling structures; and wherein the crossbar extends between the two coupling structures thereby forming an H-shape blocking structure.

18. The apparatus of claim 12, wherein the blocking structure comprise two coupling structures; and wherein the crossbar extends between the two coupling structures with an adjustable length.

19. The apparatus of claim 18, wherein the crossbar comprises a sleeve extending from one of the two coupling structures movably receiving there a bar extending from a second one of the other of the two coupling structures.

* * * * *